United States Patent
Pollington et al.

(10) Patent No.: US 9,549,315 B2
(45) Date of Patent: Jan. 17, 2017

(54) MOBILE DEVICE AND METHOD OF DETERMINING A STATE TRANSITION OF A MOBILE DEVICE

(71) Applicant: Vodafone IP Licensing Limited, Newbury, Berkshire (GB)

(72) Inventors: David Pollington, Newbury (GB); Thomas Robert Lovett, Newbury (GB); Eamonn Joseph O'Neill, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 848 days.

(21) Appl. No.: 13/725,611

(22) Filed: Dec. 21, 2012

(65) Prior Publication Data
US 2013/0184031 A1    Jul. 18, 2013

(30) Foreign Application Priority Data

Dec. 22, 2011 (GB) .................... 1122206.4
Mar. 23, 2012 (GB) .................... 1205162.9

(51) Int. Cl.
*G06F 1/00* (2006.01)
*G08B 21/00* (2006.01)
(Continued)

(52) U.S. Cl.
CPC ........... *H04W 8/22* (2013.01); *H04M 1/72569* (2013.01); *H04W 88/02* (2013.01); *H04M 2250/12* (2013.01)

(58) Field of Classification Search
CPC ...... H04W 8/02; H04W 8/22; H04M 1/72569; H04M 2250/12
(Continued)

(56) References Cited

U.S. PATENT DOCUMENTS 7,359,713 B1   4/2008 Tiwari
2006/0196931 A1   9/2006 Holtmanns et al.
(Continued)

FOREIGN PATENT DOCUMENTS

EP   2222063   8/2010
EP   2654332 A1   10/2013
(Continued)

OTHER PUBLICATIONS

IPO Search Report for GB1415921.4 dated Sep. 27, 2014.
(Continued)

*Primary Examiner* — Rafael Pérez-Gutiérrez
*Assistant Examiner* — Mark G Pannell
(74) *Attorney, Agent, or Firm* — Workman Nydegger

(57) ABSTRACT

A mobile device comprises one or more sensors; a plurality of additional sensors; and logic configured to: obtain one or more first data outputs from the one or more sensors in a first state; obtain one or more second data outputs from the one or more sensors; determine whether there has been a transition from the first state to a second state, based on a difference between the one or more first data outputs and the one or more second data outputs; obtain one or more third data outputs from the plurality of additional sensors if there has been a transition from the first state to the second state; and compare the one or more third data outputs with stored data outputs obtained using the plurality of additional sensors in a third state, thereby determining whether the mobile device is in the third state.

16 Claims, 4 Drawing Sheets

(51) Int. Cl.
*H04W 8/22* (2009.01)
*H04W 88/02* (2009.01)
*H04M 1/725* (2006.01)

(58) Field of Classification Search
USPC .................................................. 455/556.1
See application file for complete search history.

(56) References Cited

U.S. PATENT DOCUMENTS

| | | |
|---|---|---|
| 2007/0234041 A1 | 10/2007 | Lakshmeshwar et al. |
| 2008/0143518 A1 | 6/2008 | Aaron |
| 2008/0234935 A1 | 9/2008 | Wolf et al. |
| 2010/0159908 A1 | 6/2010 | Chang et al. |
| 2011/0177809 A1 | 7/2011 | Pakzad et al. |
| 2011/0239026 A1* | 9/2011 | Kulik .................... G01C 19/00 713/324 |
| 2013/0212236 A1 | 8/2013 | Foti et al. |

FOREIGN PATENT DOCUMENTS

| | | |
|---|---|---|
| EP | 2713642 A1 | 4/2014 |
| EP | 2750424 A1 | 7/2014 |
| WO | WO2008/118874 | 10/2008 |
| WO | WO 2010/111399 | 9/2010 |
| WO | WO2011/088411 | 7/2011 |
| WO | WO2011/126861 | 10/2011 |

OTHER PUBLICATIONS

GB Search Report for GB1205162.9 dated Jul. 16, 2012.
NPL_EPO-Search-Report-for-12275218.1-1858 dated May 7, 2013.
Bianchi F. et al: "Barometric Pressure and Triaxial Accelerometry-Based Falls Event Detection", IEEE Transactions on Neural Systems and Rehabilitationengineering, IEEE Service Center, New York, NY, US, vol. 18, No. 6, Dec. 1, 2010 (Dec. 1, 2010), pp. 619-627, XP011373977, ISSN: 1534-4320, DOI: 10.1109/TNSRE. 2010.2070807.

* cited by examiner

MOBILE DEVICE AND METHOD OF DETERMINING A STATE TRANSITION OF A MOBILE DEVICE

CROSS REFERENCE TO RELATED APPLICATIONS

This application claims priority to United Kingdom Application Number 1122206.4, filed on Dec. 21, 2011, and United Kingdom Application Number 1205162.9, filed Mar. 23, 2012 the entireties of which are incorporated herein by reference.

FIELD OF THE INVENTION

The present invention relates to a mobile device, and in particular to a mobile device operable to determine if it has transitioned from an unknown state to a known state. The invention also relates a method of determining a state transition of a mobile device, from an unknown state to a known state.

BACKGROUND TO THE INVENTION

Mobile devices, such as mobile phones, are more and more pervasive in many aspects of a user's daily lifestyle. However, in many respects a mobile device is still a dumb companion, with little or no awareness of its user's context, e.g. where they are, what they're doing, etc.

Mobile devices typically include one or more built-in sensors. The sensors are configured to take readings of the user's environment, such as the ambient air temperature, the device's geographic location, or the intensity of the ambient lighting. Whilst such readings may be used to infer a user's context, the sensors must generally be repeatedly polled or activated in order for the device to maintain a contextual awareness of the user. Therefore, a current solution to the above problem is to continuously monitor the context of the user using the sensors now integrated into modern smartphones, for example (accelerometer, digital compass, ambient light sensor, GPS positioning sensor, etc.), and/or explicitly requiring the user to enter their state via the handset (e.g. 'checking in' to a social media service such as Foursquare).

Repeatedly activating and taking readings from a mobile device's sensors, however, creates a noticeable drain on the device's power supply, such as its battery. This power drain is especially noticeable when the sensors are continuously active, when maintaining a constant contextual awareness. It is also burdensome and inconvenient for a user to continuously activate specific sensors of a device in order to take readings. Furthermore, users may not want their location information (for example) to be sent back to a mobile network before a user's context may be determined. Instead, users may be more content for the mobile device to determine their context internally without the need to transmit data to a third party.

There is therefore a need in the art to provide an improved mobile device that may provide services with contextual awareness, and thereby address the disadvantages encountered in the prior art.

SUMMARY OF THE INVENTION

The present invention is directed to an improved mobile device that may provide a user with contextual awareness.

In a first aspect of the present invention, there is provided a mobile device comprising one or more sensors and logic. The logic is configured to obtain one or more first data outputs from the one or more sensors when the mobile device is in a first state; obtain one or more second data outputs from the one or more sensors; and determine whether there has been a transition from the first state to a second state, based on a difference between the one or more first data outputs and the one or more second data outputs.

The mobile device may be any portable device, such as a mobile telephone, a laptop computer, a personal digital assistance, etc. In some embodiments, the mobile device need not be easily portable, and, for example, could be a desktop computer.

According to the present invention, the mobile device may more easily determine when it transitions from a first state to a second state, by differencing a data output read when the mobile device is in a first state from a data output read at a later time. Based on the difference, the mobile device may more easily determine if there has been a state transition. The one or more first data outputs may be read when the mobile device is at a known (or previously detected/encountered) state, or during a known state. Likewise, the one or more second data outputs may be read when the mobile device is at an unknown state (or one not previously detected/encountered), or during an unknown state.

A first state of a mobile device may include a stable state (e.g. characterised by relatively time-constant sensor readings) or perhaps may include a state that has been provided with an identifier, attribute or characterisation for later comparison to other sensor data. The first state may not necessarily have to be a state which is known or has previously been encountered. Similarly, a second state may not necessarily have to be a state which is unknown or that has previously not been encountered A 'state' of the mobile device may be a state characterised by the data outputs read from a plurality of sensors of the mobile device. For example, a first state (e.g. a known state) may be characterised as an 'at work' state when an accelerometer of the mobile device gives a nil reading and a GPS receiver of the mobile device gives a positional reading indicative of the user's place of work. On the other hand, a second state (e.g. an unknown state) may be defined by a GPS reading indicative of the user's place of work, but with a positive accelerometer reading. Thus, by subtracting one accelerometer reading (e.g. the positive reading) from the other (e.g. the nil reading), the mobile device may determine that it has undergone a state transition from a first state to a second state (e.g. from a known state to an unknown state). A state transition may therefore be seen as a change in data output readings at different points or periods in time.

Advantageously, the determination of a state transition may be confined to the device. For example, in the case of a mobile phone, determination of state transition need not be communicated to the device's mobile network and the processing may be carried out within the device. This may improve user privacy.

The mobile device may further comprise one or more additional sensors. The logic may be further configured to obtain one or more third data outputs from a plurality of the additional sensors if there has been a transition from the first state to the second state. The one or more sensors and/or the one or more additional sensors may be configured to measure characteristics of the second state.

If the mobile device determines that it has transitioned from a first state to a second state, it may then 'characterise' the second state by activating multiple sensors and taking a plurality of readings in the second state. This may allow the mobile device to characterise, or otherwise apply a signature or fingerprint to, the second state. Thus, the second (unknown) state may then become in effect a known state, defined by the data outputs of multiple sensors. The logic in the device may furthermore be configured compare the one or more third data outputs with stored data outputs obtained using a plurality of additional sensors in a third state of the mobile device, the third state being a state prior to the first state, thereby determining whether the mobile device is in the third state. Thus, the device may be configured to first detect a state transition, then take multiple measurements/readings of the new state using a plurality of additional sensors, and then compare these readings to stored readings taken by the same additional sensors in a prior state. Thus, the device may determine if it has transitioned to a previously encountered state. Depending on the state it has transitioned to, the device may configure itself accordingly (e.g. enter a 'sleep' mode).

The characteristics of the second state may include the data outputs read from the sensors when the mobile device is in the second state (or unknown state). The one or more additional sensors (or 'characterising' sensors), used to turn an unknown state into a 'known' state, may characterise the unknown state by virtue of their data outputs. The one or more sensors (or 'heartbeat' sensors), used to determine a state transition, may also characterise the unknown state with their data outputs. Furthermore, the unknown state may be characterised based on a time period over which the one or more first data outputs and/or the one or more second data outputs are read.

Once a second, unknown (or not yet encountered) state has been characterised, the one or more additional sensors may be switched off or deactivated, in order to conserve the device's resources.

A state of the mobile device may be defined as known or unknown based on the data outputs read from a plurality of sensors of the mobile device. For example, a state may be defined as a known state only once a predefined number of sensors are used to take readings when in the state. Thus, for instance, a state may remain an unknown state until the mobile device has acquired a reading from each of: its accelerometer, its GPS receiver, its thermometer, and its microphone.

The plurality of additional sensors may be selected according to the one or more first data outputs. As will be described below in more detail, in one embodiment, a state may be characterised as a dynamic state (e.g. if a positive accelerometer reading is given) or a static state (e.g. if a nil or relatively low accelerometer reading is given). It may therefore be advantageous to select the sensors used to characterise an unknown state and define it as a known state based on the sensor readings in the known state. As an example, if, in a known state, the one or more first data outputs characterise the known state of the device as being an 'at home' known state, then the device, upon detecting a state transition to from a first (known) state to a second (unknown) state, may select a GPS receiver of the device as one of the additional sensors used to characterise the unknown state (e.g. to determine where the user is heading to).

The device may furthermore be configured to carry out certain actions or perform certain methods in response to detecting a state transition. For example, assume a dynamic state of the device is determined to have transitioned to an unknown state. By activating multiple sensors, the device may then determine that the unknown is a static state and that the device is in an 'at work' state. In such a scenario, the device may be configured to synchronise the device with the user's e-mail server. Thus, a user's e-mail may be synchronised only when the device is in the 'at work' state, and not periodically, as typically found in the prior art. This reduces the energy drain on the device.

In another scenario, the device may be configured to lock itself should no state transition be detected over a predetermined time period. For example, if a device is left on a user's desk, the data outputs from the sensors are unlikely to register much change over time. The device may therefore be configured to lock after five minutes of relatively constant data output readings.

The plurality of additional sensors may be selected according to the difference between the one or more first data outputs and the one or more second data outputs. If there is a large difference between the first data outputs and the second data outputs, then the device may choose to activate a large number of additional sensors upon detecting a state transition, or else may choose to activate only a specific sensor.

The plurality of additional sensors may outnumber the one or more sensors. This may be preferable when only a single sensor is polled (e.g. a 'heartbeat' sensor) in the mobile device's first state. A heartbeat sensor may be a sensor that expends a relatively small amount of energy in order to be run. Once the heartbeat sensor produces a data output that allows the device to detect a state transition, multiple sensors may then be activated to provide a full and complete 'fingerprint' of the second (and as yet unknown) state. This increases the number of sensors that may then act as a heartbeat sensor for subsequent data output readings, since the previously unknown state (now characterised as a known state) will comprise multiple different data outputs that define it, each output being from a respective sensor. Thus, the subsequent heartbeat sensor may then be chosen from any one of these sensors.

The logic may be further configured to periodically obtain one or more data outputs from the one or more sensors until the logic determines there has been a transition from the first state to a second state. This may ensure that state transitions are regularly identified, and may preferably allow the states into which transitions occur to be rapidly identified and catalogued, for example.

The logic may be further configured to measure characteristics of the second state using stored data outputs obtained from a plurality of sensors of the mobile device in a state prior to the first state. Thus, if sensor readings are very similar to a set of sensor readings that have been stored on the device, the device may allocate the state characterisation used for the stored readings to the new readings. In some embodiments, stored data outputs may originate from other devices. For example, the mobile device, having taken a set of sensor measurements, may then consult a database of stored sensor readings in order to match the sensor measurements it has just taken with a set of stored measurements. This may allow the mobile device to more rapidly and efficiently characterise the unknown state.

The logic may be further configured to determine there has not been a transition from the first state to a second state if the difference between the one or more first data outputs and the one or more second data outputs does not exceed a predetermined threshold. Thus, the mobile device may determine that there has not been any state transition if the difference in data outputs is negligible, or below a predetermined threshold. As an example, a mobile device in a state characterised as a 'user sleeping' characterised or known state may determine that a state transition has occurred when the ambient light sensor measures an ambient light level that exceeds a predetermined threshold (this could be used to then trigger an alarm clock, to wake the user, for example).

The logic is further configured to determine whether there has been a transition from the first state to a second state based on a comparison of the one or more first data outputs with the one or more second data outputs. A comparison may be useful when comparing the data output readings from two different sensors, whose respective readings cannot be directly subtracted, one from the other.

The mobile device may be operable to receive data input so as to confirm whether there has been a transition from the first state to the second state. Data input may be in form of a user manually inputting data into the device (e.g. via a keypad or a touch screen), or could be communicated (wirelessly or otherwise) to the device from another, remote device. For example, data readings characterising an unknown state may be uploaded to a server that then compares the readings with stored readings, the stored readings having been obtained when the device was in previous unknown states. The uploaded readings may then be compared with the stored readings to determine the most relevant characterisation of the state the device currently is in. This characterisation (e.g. a label) may then be transmitted to the mobile device, and associated with the (unknown) state the device is currently in, thus effectively making it a known state. Furthermore, a set of data outputs may be built up, each attributed to a given state of a mobile device. A user may then individually define each state according to predefined or user-defined states or categories of state, for example. This could be carried out using a calendar-type feature in the user's device.

A sensor of the mobile device may be selected from one of the following: an accelerometer, a digital compass, a GPS receiver, a microphone, an ambient light sensor, a thermometer, a radio receiver, a BLUETOOTH receiver, and a WI-FI receiver. Other types of sensors may be used. A radio or network receiver may detect cell switching of the mobile device, especially when considering a device such as a mobile telephone. Thus, rather than using a device's GPS sensor to monitor the mobile telephone's position according to mobile cells (this being relatively power-intensive), the device's radio receiver may do so instead, and, using this information, may characterise an unknown or uncharacterised state of the device.

Thus, a mobile device according to the present invention may employ multiple sensors selectively in order to identify or detect state transitions. Preferably, the device may adopt a state-based model to sample and label user context. The ability to perform this process solely on the mobile device (without additional server-side components) is also advantageous.

In a second aspect of the present invention, there is provided a method of determining a state transition of a mobile device having one or more sensors. The method comprises obtaining one or more first data outputs from the one or more sensors when the mobile device is in a first state; obtaining one or more second data outputs from the one or more sensors; and determining whether there has been a state transition from the first state to a second state, based on a difference between the one or more first data outputs and the one or more second data outputs.

The mobile device may further comprise one or more additional sensors, and the method may further comprise obtaining one or more third data outputs from a plurality of the additional sensors if there has been a state transition from the first state to a second state. The one or more sensors and/or the one or more additional sensors may be configured to measure characteristics of the second state. The method may further carry out any of the steps described above and specifically in relation to the mobile device.

In a third aspect of the present invention, there is provided a computer-readable medium for storage on a mobile device. The computer-readable medium comprises executable code configured such that, when executed on a computer, the code will perform any of the above-described methods. The code may be stored on any suitable medium, such as a flash drive, a CD-ROM, a hard disk, etc., or may be sent as a signal.

It should be noted that any feature described above may be used with any particular aspect or embodiment of the invention.

BRIEF DESCRIPTION OF THE DRAWINGS

Several embodiments of the present invention will now be described by way of example and with reference to the following drawings, in which.

DETAILED DESCRIPTION OF EMBODIMENTS OF THE INVENTION

Whilst various embodiments of the present invention are described below, the invention is not limited to these embodiments and variations of these embodiments may well fall within the scope of the invention which is to be limited only by the appended claims.

Further embodiments and specific examples may be found in the appended Annex, "Event-based Context Sampling and Online Inference with Mobile Devices", which is incorporated into this description.

Figure 1:
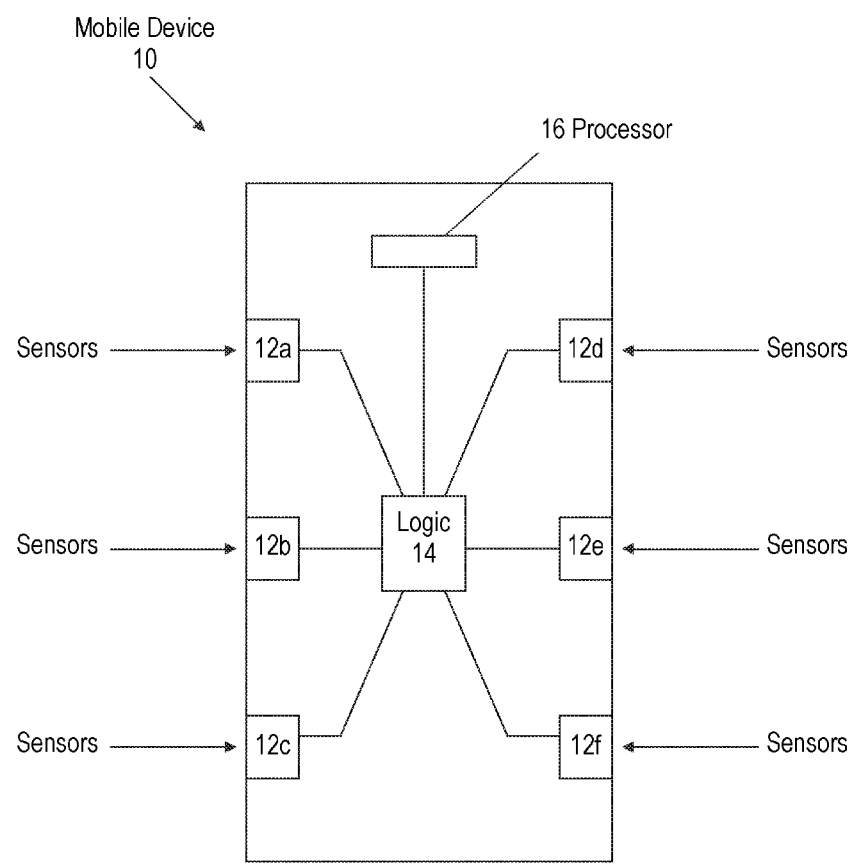
FIG. 1 shows a schematic diagram of a mobile device in accordance with an embodiment of the present invention.

FIG. 1 illustrates a mobile device in accordance with an embodiment of the present invention. Mobile device 10 comprises six sensors, 12a-12f, logic 14 stored in a suitable medium of the mobile device, such as a memory of the mobile device, and processor 16. Mobile device 10 is typically any portable device, such as a mobile telephone, a laptop computer, a personal digital assistance, etc. In other embodiments, the mobile device need not be easily portable, and, for example, could be a desktop computer.

Sensors 12a-12f are configured to accept input from the outside environment. For example, sensor 12a may be an ambient light sensor and may comprise a photosensitive detector adapted to measure a light level outside of mobile device 10. Sensor 12b may be an accelerometer and may be configured to measure an acceleration of mobile device 10 along a plurality of axes. Sensor 12c may be a GPS receiver and may be configured to measure a geographic position of mobile device 10, by receiving relevant data from GPS satellites. Sensors 12c-12f could comprise a network sensor, such as a radio transceiver adapted to receive communications from, and transmit them to, a mobile network of device 10.

Logic 14 is operatively connected to each of sensors 12a-12f and is configured to read a corresponding data output from each of sensors 12a-12f. Processor 16 is connected to logic 14 and is configured to read logic 14 so as to manipulate and process the data outputs read from sensors 12a-12f. Mobile device 10 may further comprise a memory (not shown) which may be configured to store data outputs read from sensors 12a-12f. Processor 16 may then be further configured to access data outputs stored in the memory, and manipulate these stored values, and may combine them with fresh data outputs read from one or more of sensors 12a-12f.

Mobile device 10 is used to determine whether there has been a transition from a first state (such as a known state) to a second state (which could be an unknown state). In what follows, various advantages and particular implementations of the present invention are described.

As outlined in the background to the invention, rather than continuously monitoring the activity of a handset/its user to determine context, a better approach is to treat the activity of the user as a set of discrete states—for instance, sitting at a desk, making a cup of coffee in the kitchen, having lunch in the work canteen, etc. A mobile device according to the present invention allows one to identify when there is a change in state (a state transition) and thereafter may determine the identity of the new state that has been entered. Doing so enables a reduction in the number of sensors that need to be continually active (or periodically active) and, most importantly, avoids the use of 'expensive' sensors (such as a GPS receiver) that would otherwise have to be repeatedly polled and drain the battery life of the handset. Once a transition in state has been detected, the mobile device can then turn on the additional sensors it needs and, through a process of 'sensor fusion', derive the new state that the individual (and their handset) has entered. By building up heuristic knowledge of the states that the user commonly enters, the mobile device can create a profile of the user and their most common (or habitual) states, and thereby use this for improving state recognition and/or predicting future states based on states that have already been traversed within a given time period.

For example, rather than simply using an accelerometer to determine movement, the mobile device may use algorithms across multiple sensor-based data sets to characterise the context of the individual. For instance, whilst in a meeting, an individual may leave their handset on the table, in a pocket, or be 'fiddling' with it—each of these scenarios will be creating very different sensor profiles, but all pertain to the same static state of 'in a meeting'.

1. Context State Definition

The mobile device captures data from one or more sensors (accelerometer, digital compass, GPS receiver, Wi-Fi receiver, Cell ID, microphone, ambient light sensor, etc.) and uses 'sensor fusion' techniques and algorithms that are processed on the handset to create a unique fingerprint for the current context of an individual/handset (note that this fingerprint is not a static snapshot, but rather a characterisation created by sensor outputs within a specific temporal pattern and amplitude, and, when combined with the outputs of additional sensors, uniquely identify a state associated with an individual/handset). 'Sensor fusion' is the term used to describe multiple sensors generating respective data outputs, these outputs then being read by logic of the mobile device so as to determine whether a state transition has occurred.

States are defined as the characterisation of a context of an individual in such a way as to have semantic meaning, either to the individual or across a group of individuals. A 'common' state most likely refers to a context that is linked to a place that is frequently visited (such as 'home' or 'work' on a macro level, or else 'desk' or 'canteen' on a micro level). An 'ad hoc' state represents a transient context which is common across a group of individuals at a time and place (such as being stuck in a traffic jam on a motorway). When an 'adhoc' state is repeated consistently (e.g., a traffic jam at a known traffic black spot), then such a state may then become a 'common' state with a specific semantic tag (e.g. traffic jam on Heathrow Airport spur road). The respective outputs from multiple sensors of the mobile device may be used to characterise and assign an 'output signature' to each of these states, or contexts.

2. Context State Transition Triggering

In one embodiment, the mobile device identifies when a sensor output exceeds given thresholds, hence signalling a change in user state, possibly from a known state to an unknown state. The mobile device may be effectively moving from a static state to a dynamic one, and vice versa—e.g. getting up from your desk at work and walking to somewhere else. Upon transiting from one state to another (e.g. from a static state to a dynamic state), the mobile device may activate and analyse the outputs from additional sensors (sensor fusion) in order to identify the new state is (e.g. as described under "Context state definition"). The sensors that are employed will depend on the type of state the user is transitioning into, e.g. location-based sensors for a static state, and activity-based sensors for a dynamic state.

3. Context State Semantic Labelling & Correction

In order for the state information to be useful across a variety of different applications, it may be necessary to attach a semantic meaning to the state (at the very least, to those states that are common/habitual for the individual in question, or, alternatively, to all states, in which case generic tags may be used to describe ad hoc states that are common across multiple individuals, such as being in a traffic jam). There are multiple mechanisms that could be employed to attribute semantic meaning to each static state:

- States are populated into an 'inference' calendar and presented to the user for manual tagging and/or correction of inferred tags—to minimise the load on the user, this could be constrained to only common states.
- If the user uses a social media check-in service, then this semantic tag may also be used to tag that particular state recognised by the system (by leveraging public social media APIs to obtain details of the activity that the individual in question posted on the social media site).
- Similarly, if the individual uses #tags to represent their current context, this information could also be harvested by open APIs (e.g. TWITTER APIs) for semantic tagging.
- If the individual redeems a voucher (via their mobile handset) at a Point of Sale, then the information relating to which store the individual is in could also be used for semantically tagging the state (context) of the individual.
- If the user enters a state that is recognised as similar to an historic state recorded for another individual, then there may be the option of applying that state's tag to the user's state (effectively, a form of implicit crowd-sourcing of tags). Grouping state patterns across multiple users generates a library of semantically tagged patterns against which the pattern/state of a new user can be compared, thereby determining the place of the user without the need for explicit training for that user.

Advantages of the present invention include:

The invention may make use of event-based sampling, i.e. sampling based upon state transition, rather than periodic (or continuous, or random) polling of sensors, hence minimising battery impact by selectively using handset sensors to determine user context.

The invention may provide rich, real-time contextual information for a given user that can be used within a wide range of services.

The invention may be carried out on a mobile device without the need for user interaction (although user interaction is likely to improve performance, such as in the case of embodiments directed to labelling and correction).

By recognising and historically creating a record of user states, the invention may provide context/state information to a $3^{rd}$ party system without explicit user interaction (as would be the case with current social media systems that require the user to check-in manually each time a location is visited). In effect, a user would only have to 'check-in' (i.e. semantically tag) a location (state) once, and thereafter the system could automatically 'check-in' the user whenever that place was visited.

Furthermore, the invention may (but not necessarily does) operate entirely on the handset without sending user data to $3^{rd}$ parties, hence protecting the privacy of the user (i.e. contextual information may be derived on the handset and provided solely to applications on the handset to which the user has granted authorisation to use that information)—in doing so, the user is given a greater degree of privacy and control over the use of the data.

The present invention may be used in various different applications, examples of which are described below.

Transport (Traffic Congestion)

By defining journey paths as a succession of states (waypoints), common states (waypoints) across a multitude of users may indicate traffic blackspots (either historically or at a particular time). Note that, in this example, it may be assumed that a state will only be triggered when the user/car is deemed to have stopped (e.g. transitioned from a dynamic, moving state to a static, stationary state). As well as identifying traffic congestion, the invention could also be used to determine which motorway service stations are most popular for people on a journey travelling between two given points.

Shopping Mall

The invention may provide an effective solution for determining which store a user has visited, or is currently in, by identifying a unique state for each store (e.g., a combination of data outputs relating to location, movement, ambient lighting and ambient noise, determined through the mobile device's sensors). Taking a semantic approach to identifying which stores a user has visited obviates the need to deploy dedicated infrastructure for providing indoor positioning.

Network Optimisation

The invention may compare user state (context) against behaviour to identify where entering a given state might lead to a common behaviour (service usage). By linking behaviour with state, and predicting states across multiple users, a mobile network operator may then predict likely demand (usage) of services, and hence optimise the mobile network accordingly. This may include noting which content is downloaded when users enter a given state (which in this case may be defined according to the data outputs read from location sensor and a time sensor), and precaching content accordingly, based on the number of users likely to be entering that state (place) in a given timeframe.

Network Offload

Increasingly, mobile network operators are looking at various network offload strategies that leverage small cell technologies (e.g. WI-FI and Femto cells) to better manage and optimise the capacity and service offered by a cellular network. With the present invention, it may be possible for handsets to search for WI-FI points at the moment of state transition rather than periodically, hence increasing the likelihood of a WI-FI network being joined as soon as the user arrives at a new destination, and increasing battery efficiency. This is in contrast to handsets continually polling for available WI-FI networks.

Enterprise Presence

Awareness of a change of state could be used in an enterprise context for providing more accurate presence information. Typically, personal computer systems monitor keyboard activity as an indicator of whether an individual is available or 'away', but this can deliver false information if, for instance, the individual is reading at their desk, or is engaged in a conference call, rather than actively using the PC keyboard. With the present invention, using the mobile handset as a trigger point in addition to the keyboard, the resulting enriched presence system would have a better understanding of the individual's actual context. By building up a time-stamped record of the states that a user enters, it may be possible to start predicting which state an individual might be transitioning to either on a short-term basis (e.g. 'has left desk, predict going to office canteen') or a longer-term basis (e.g. populating the user's calendar with availability information for the use of other individuals—e.g. 'David tends to work from home on a Friday so don't book meetings at the office location, but a conference call would be acceptable').

User Profiling

By building up a record of the states (places) that are common to an individual, it becomes possible to assign semantic inference to that individual. For instance, a high proportion of states tagged as relating to shopping may be a leading indicator that the individual in question likes to shop (or works in a shop).

Figure 2:
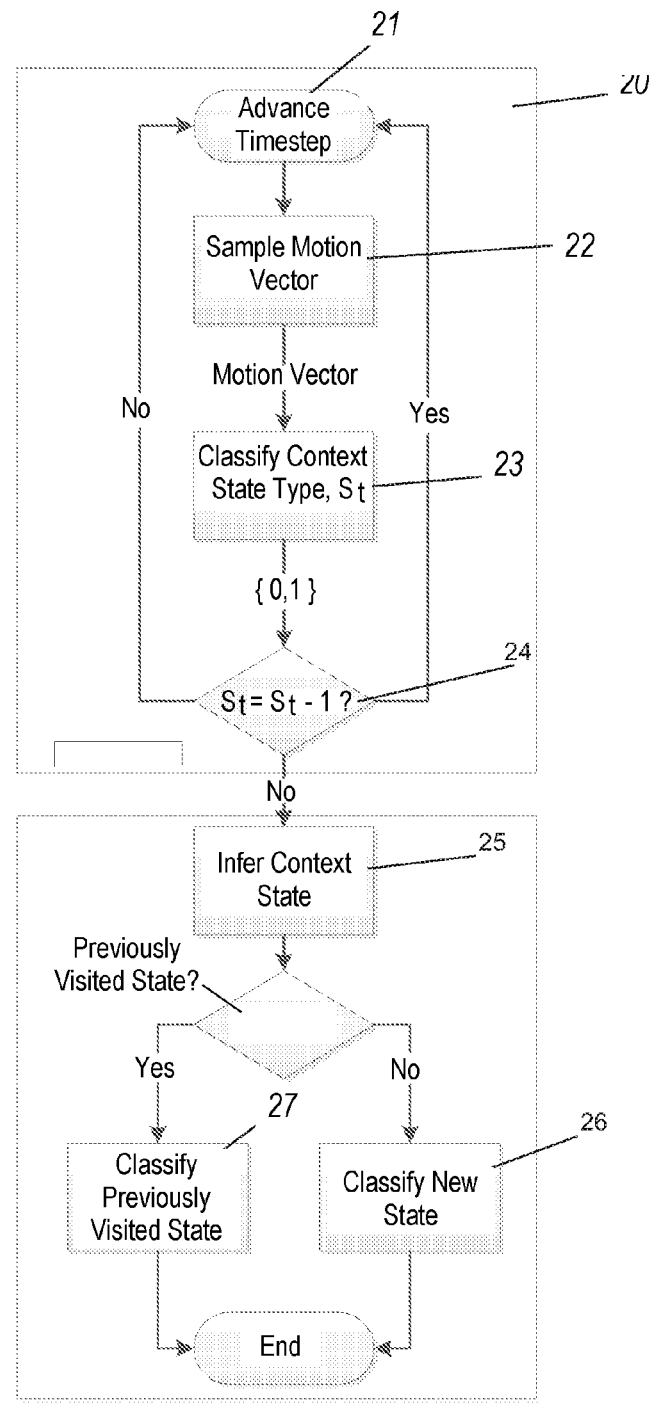
FIG. 2 is a flow diagram illustrating the steps taken by a mobile device for determining a context state transition and identifying a context state, in accordance with an embodiment of the present invention.

FIG. 2 illustrates the steps taken in a method according to a preferred embodiment of the present invention. In this embodiment, a mobile device (e.g. mobile device 10 of the embodiment described above) determines that a state transition has occurred, and in particular may determine when the mobile device has transitioned from a known state to an unknown state. The mobile device may then identify the unknown state, thereby rendering it a known state.

In step 21, an internal clock in the mobile device advances one timestep forwards. An arbitrary time unit may be used, such as ten seconds. Thus, the mobile device may perform method 20 every timestep, for example every ten seconds.

In step 22, the mobile device takes a motion reading from a motion sensor (e.g. an accelerometer). The received data is a vector describing component-wise intensity of motion. If the mobile device is stationary, for example, then the motion sensor reads a motion vector of zero intensity for all three components. If the mobile device is moving at a constant velocity (constant magnitude and direction), then the motion sensor may read the corresponding intensity of motion.

In step 23, the mobile device classifies whether the device is in a 'static' or a 'dynamic' state, given the current motion vector. The mobile device may use a low-pass filter in series with a pre-trained binary classifier, together with a moving average filter (which stores a short history of previous binary classifier outputs). Further details of this step are described in the Annex, especially with reference to FIG. 2 of the Annex.

In step 24, the mobile device determines whether the output state type at this timestep is equivalent in {0,1} to the previous timestep's output state type. If yes, no transition is classified, and the next iteration may begin. If no, a transition is classified, triggering the inference process and beginning the next timestep iteration.

In step 25, depending on the new context state type (static or dynamic), the mobile device takes a set of data samples from that type's sensors. The mobile device then performs statistical inference on these samples and decides whether the context state has previously been observed, or whether it is a new, previously unvisited state. If the state is a previously unvisited state, the mobile device assigns different labels to the classified state (step 26). If the state is a previously visited state, the mobile device assigns the label of the identified previously visited state to the newly classified state (step 27). This state is now an instance of the previously visited state. In order to classify a new state, the mobile device assigns a new, unique label to the newly classified state. This state is now the first instance of the newly labelled state.

In step 28, the inference process terminates.
Other example inference techniques are described in the Annex under "Inference and Classification" on page 10.

Figure 3:
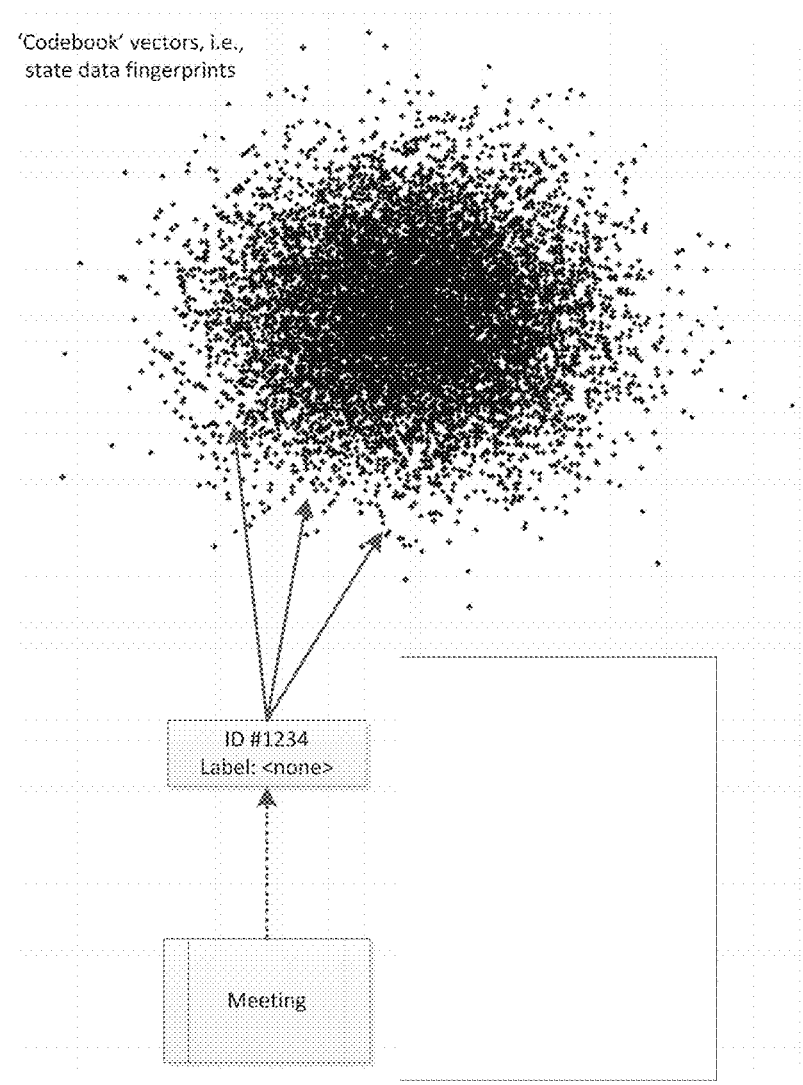
FIG. 3 is a schematic diagram illustrating an example of user context labelling, in accordance with an embodiment of the present invention.

FIG. 3 illustrates a method of user context labelling, in accordance with a preferred embodiment of the present invention. A state is described by a set of codebook vectors. Once a state has been identified, the user can assign a human-readable label to the state. Once assigned, the label will be displayed to the user on future classifications of the state (e.g. in FIG. 3, state #1234). Before this label is applied, the state is identified only by a unique ID assigned by the identification process. Through an interface, the user can label the state and, upon labelling, all instances of that state (both past and future) will be associated with this label unless re-labelled.

Figure 4:
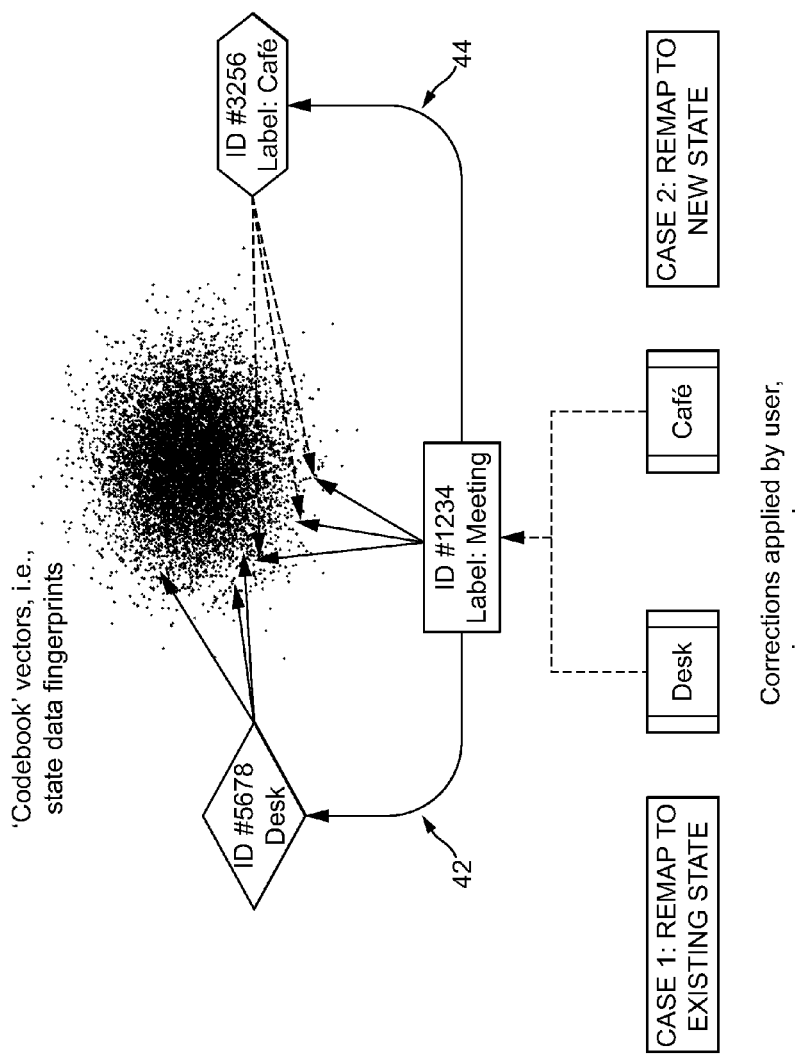
FIG. 4 is a schematic diagram illustrating an example of user context correction, in accordance with an embodiment of the present invention.

FIG. 4 illustrates a method of user context creation, in accordance with a preferred embodiment of the present invention. The user can correct the system identification which, in turn, affects future system outputs. There are three types of corrective action:

Add: The user creates a state that partially overwrites one or more identified states. The states that are partially overwritten by this new state are used to create the codebook vectors for the new state, and the user's new label is assigned to it. Furthermore, it is assigned a unique ID by the system.

Edit: There are two types of edit for an identified state: i) the user re-labelling the identified state as a previously labelled state (Case 1); and ii) the user re-labelling the identified state as a new, previously unidentified state (Case 2).

Delete: The user removes an identified state. If there is only one instance of this state, it is removed entirely. If not, this instance alone is removed and previous updates to the codebook vectors are undone.

In FIG. 4, at step 42, the state with the label 'Desk' exists, and so, upon user correction, the sensor data from the incorrect instance of 'Meeting' may be used to update the codebook vectors for the state 'Desk'. At step 44, the state with the label 'Café' does not exist, and so a new state is created with a unique ID and label 'Café'. The sensor data from the incorrect instance of 'Meeting' are used to create the codebook vectors for the state 'Café'.

Many combinations, modifications, or alterations to the features of the above embodiments will be readily apparent to the skilled person and are intended to form part of the invention. Furthermore, a person skilled in the art will recognise that any of the features described as specifically relating to one embodiment may be used in any other embodiment, by making the appropriate changes.

The invention claimed is:

1. A mobile device comprising:
a first set of sensors that includes one or more physical, hardware sensors configured to sense physical characteristics including at least one of acceleration, location, temperature and ambient noise;
a second set of sensors that includes a plurality of additional physical, hardware sensors, wherein the number of sensors that are part of the second set of sensors varies according to the size of the difference in values between one or more first data outputs and one or more second data outputs; and
logic configured to:
obtain the one or more first data outputs from the first set of sensors when the mobile device is in a first known state;
obtain the one or more second data outputs from the first set of sensors;
determine whether there has been a transition from the first state to a second, unknown state, based on a difference between the one or more first data outputs and the one or more second data outputs, wherein the mobile device stays in the second unknown state until the mobile device has received sensor inputs from a minimum threshold number of sensors in the second set of sensors;
obtain one or more third data outputs from the second set of sensors if there has been a transition from the first state to the second state; and
compare the one or more third data outputs with stored data outputs previously obtained using the second set of sensors when the mobile device was in a third state, the third state being a state prior to the first state, thereby determining whether the mobile device is in the third state.

2. The mobile device of claim 1, wherein the one or more sensors and/or the plurality of additional sensors are configured to measure characteristics of the second state.

3. The mobile device of claim 1, wherein the plurality of additional sensors is selected according to the one or more first data outputs.

4. The mobile device of claim 1, wherein the plurality of additional sensors is selected according to the difference between the one or more first data outputs and the one or more second data outputs.

5. The mobile device of claim 1, wherein the plurality of additional sensors outnumbers the one or more sensors.

6. The mobile device of claim 1, wherein the logic is further configured to periodically obtain one or more data outputs from the one or more sensors until the logic determines there has been a transition from the first state to a second state.

7. The mobile device of claim 1, wherein the logic is further configured to compare characteristics of the second state against stored data outputs obtained from a plurality of sensors of the mobile device in a state prior to the first state.

8. The mobile device of claim 1, wherein the logic is further configured to determine there has not been a transition from the first state to a second state if the difference between the one or more first data outputs and the one or more second data outputs does not exceed a predetermined threshold.

9. The mobile device of claim 1, wherein the logic is further configured to determine whether there has been a transition from the first state to a second state based on a comparison of the one or more first data outputs with the one or more second data outputs.

10. The mobile device of claim 1, wherein the mobile device is operable to receive data input so as to confirm whether there has been a transition from the first state to the second state.

11. The mobile device of claim 1, wherein a sensor of the mobile device is selected from one of the following: an accelerometer, a digital compass, a GPS receiver, a microphone, an ambient light sensor, a thermometer, a radio receiver, a short-range wireless receiver, and a long-range wireless receiver.

12. The mobile device of claim 1, wherein the logic further executes one or more specified actions in response to detecting a state transition.

13. The mobile device of claim 12, wherein the one or more specified actions that is performed in response to detecting a state transition comprises synchronizing an email application with an email server upon determining that the mobile device is in a specified state.

14. A method of determining a state transition of a mobile device having a first set of one or more physical, hardware sensors, and a second set of sensors that includes a plurality of additional physical, hardware sensors, the method comprising:

obtaining one or more first data outputs from the first set of sensors when the mobile device is in a first known state;

obtaining one or more second data outputs from the first set of sensors;

determining whether there has been a state transition from the first known state to a second, unknown state, based on a difference between the one or more first data outputs and the one or more second data outputs, wherein the mobile device stays in the second unknown state until the mobile device has received sensor inputs from a minimum threshold number of sensors in the second set of sensors, wherein the number of sensors that are part of the second set of sensors varies according to the size of the difference in values between one or more first data outputs and one or more second data outputs;

obtaining one or more third data outputs from the second set of sensors if there has been a transition from the first state to the second state; and comparing the one or more third data outputs with stored data outputs previously obtained using the second set of sensors when the mobile device was in a third state, the third state being a state prior to the first state, thereby determining whether the mobile device is in the third state.

15. The method of claim 14, wherein the one or more sensors and/or the plurality of additional sensors are configured to measure characteristics of the second state.

16. A physical computer-readable hardware storage device for storage on a mobile device, wherein the computer-readable medium comprises executable code configured such that, when executed on a computer, the code will perform the method of claim 14.

* * * * *